(12) United States Patent  (10) Patent No.: US 7,598,708 B2
Kimura et al.  (45) Date of Patent: Oct. 6, 2009

(54) BATTERY PROTECTING APPARATUS AND BATTERY PROTECTING CIRCUIT

(75) Inventors: Daisuke Kimura, Atsugi (JP); Yukihiro Terada, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 364 days.

(21) Appl. No.: 11/512,690

(22) Filed: Aug. 30, 2006

(65) Prior Publication Data

US 2007/0096695 A1  May 3, 2007

(30) Foreign Application Priority Data

Oct. 31, 2005  (JP) ............................. 2005-317146

(51) Int. Cl.
*H02J 7/00* (2006.01)
*H02H 3/00* (2006.01)

(52) U.S. Cl. .......................... 320/132; 320/136; 361/89

(58) Field of Classification Search ................. 320/134, 320/136, 132; 361/89; 307/10.7
See application file for complete search history.

(56) References Cited

U.S. PATENT DOCUMENTS 6,812,673 B2 *  11/2004  Fujiwara ..................... 320/136

FOREIGN PATENT DOCUMENTS

JP  2005-12852  1/2005

* cited by examiner

*Primary Examiner*—Edward Tso
*Assistant Examiner*—Richard V Muralidar
(74) *Attorney, Agent, or Firm*—Ladas & Parry LLP

(57) ABSTRACT

A battery protecting circuit is disclosed that includes a negative voltage terminal voltage detecting circuit that detects when a voltage of a negative voltage terminal decreases to less than a predetermined voltage; an abnormality detecting circuit that detects an abnormality in charge/discharge conditions of a battery; a switch that is connected between the battery and the negative voltage terminal, the switch being turned off when the negative voltage terminal voltage detecting circuit detects that the voltage of the negative voltage terminal has decreased to less than the predetermined voltage and when the abnormality detecting circuit detects the abnormality in the charge/discharge conditions of the battery; a delay time reducing circuit that reduces a time period from a time the abnormality in the charge/discharge conditions of the battery is detected to a time the switch is turned off when the voltage of the negative voltage terminal decreases to less than the predetermined voltage; and an output invalidating circuit that invalidates an output of the negative voltage terminal voltage detecting circuit.

5 Claims, 4 Drawing Sheets

BATTERY PROTECTING APPARATUS AND BATTERY PROTECTING CIRCUIT

BACKGROUND OF THE INVENTION

1. Field of the Invention

The present invention relates to a battery protecting apparatus and a battery protecting circuit that includes a negative voltage terminal voltage detecting circuit that detects when the voltage of a negative voltage terminal decreases to less than a predetermined voltage, an abnormality detecting circuit that detects an abnormality in the charge/discharge conditions of a battery, and a switch that disconnects the connection between the battery and the negative voltage terminal when the negative voltage terminal voltage detecting circuit detects that the voltage of the negative voltage terminal has decreased to less than the predetermined voltage and when the abnormality detecting circuit detects an abnormality in the charge/discharge conditions of the battery.

2. Description of the Related Art

A rechargeable battery such as a lithium ion battery may be substantially degraded when it is under abnormal conditions such as overcharge, over discharge, and over current conditions. Therefore, such a rechargeable battery is usually protected from overcharge, over discharge, and over current by a battery protecting IC. Conventionally, detection of overcharge, over discharge, and/or over current conditions is delayed in order to avoid unnecessary abnormality detections.

However, in this case, the delay time increases the inspection time required for inspecting the protecting operations. Accordingly, the battery protecting IC preferably has a function of reducing such a delay time during inspection. In a conventional battery protecting IC, a dedicated pad (terminal) is provided for reducing the delay time during inspection, and the delay time is reduced by issuing commands to the dedicated pad during inspection so that the function of reducing the delay time may be activated. However, including such a dedicated pad leads to an increase in the chip area and cost increase.

In view of such circumstances, Japanese Laid-Open Patent Publication No. 2005-12852 discloses a battery protecting IC that reduces the inspection time without using a dedicated pad by activating the function of reducing the delay time when the potential of a negative voltage terminal is set to a negative potential that is not generated during normal operations.

However, in the case of activating the function of reducing the delay time when the potential of the negative voltage terminal is set to a negative potential that is not generated during normal operations in the battery protecting IC, for example, a function of detecting the connection of an overcharging charger between a positive voltage terminal and a negative voltage terminal may not be implemented when the potential of the negative voltage terminal is set to the negative potential.

SUMMARY OF THE INVENTION

According to an aspect of the present invention, a technique is provided for enhancing the functions of a battery protecting circuit without increasing the number of external terminals.

According to one embodiment of the present invention, a battery protecting circuit is provided that includes:

a negative voltage terminal voltage detecting circuit that detects when a voltage of a negative voltage terminal decreases to less than a predetermined voltage;

an abnormality detecting circuit that detects an abnormality in charge/discharge conditions of a battery;

a switch that is connected between the battery and the negative voltage terminal, the switch being turned off when the negative voltage terminal voltage detecting circuit detects that the voltage of the negative voltage terminal has decreased to less than the predetermined voltage and when the abnormality detecting circuit detects the abnormality in the charge/discharge conditions of the battery;

a delay time reducing circuit that reduces a time period from a time the abnormality in the charge/discharge conditions of the battery is detected to a time the switch is turned off when the voltage of the negative voltage terminal decreases to less than the predetermined voltage; and an output invalidating circuit that invalidates an output of the negative voltage terminal voltage detecting circuit.

In a preferred embodiment, the output invalidating circuit invalidates the output of the negative voltage terminal voltage detecting circuit during inspection, and validates the output of the negative voltage terminal detecting circuit after the inspection.

In another preferred embodiment, the output invalidating circuit is connected between ground and the output of the negative voltage terminal voltage detecting circuit, and includes a fuse; and the output of the negative voltage terminal voltage detecting circuit may be validated by melting the fuse.

In another preferred embodiment, the negative voltage terminal voltage detecting circuit, the abnormality detecting circuit, and the output invalidating circuit are integrated in a single chip.

According to an aspect of the present invention, the output of the negative voltage terminal voltage detecting circuit may be invalidated by the output invalidating circuit and the voltage of the negative voltage terminal may be decreased to less than a predetermined voltage to activate the delay time reducing circuit. In this way, the time period from the time an abnormality is detected by the abnormality detecting circuit to the time the switch is turned off may be reduced, and the inspection time for inspecting the abnormality detecting circuit may be reduced.

According to another aspect of the present invention, the time period from the time an abnormality is detected by the abnormality detecting circuit to the time the switch is turned off may be reduced by controlling the voltage of the negative voltage terminal so that a terminal for enabling the time reduction may not be necessary. In this way, the chip area may be reduced in the case where the battery protecting circuit is an integrated circuit.

According to another aspect of the present invention, by validating the output of the negative voltage terminal voltage detecting circuit by the output invalidating circuit after inspection of the abnormality detecting circuit, a function of turning off the switch in response to occurrence of an abnormal voltage at the negative voltage terminal may be implemented.

DETAILED DESCRIPTION OF THE PREFERRED EMBODIMENTS

In the following, preferred embodiments of the present invention are described with reference to the accompanying drawings.

[Overall Configuration]

Figure 1:
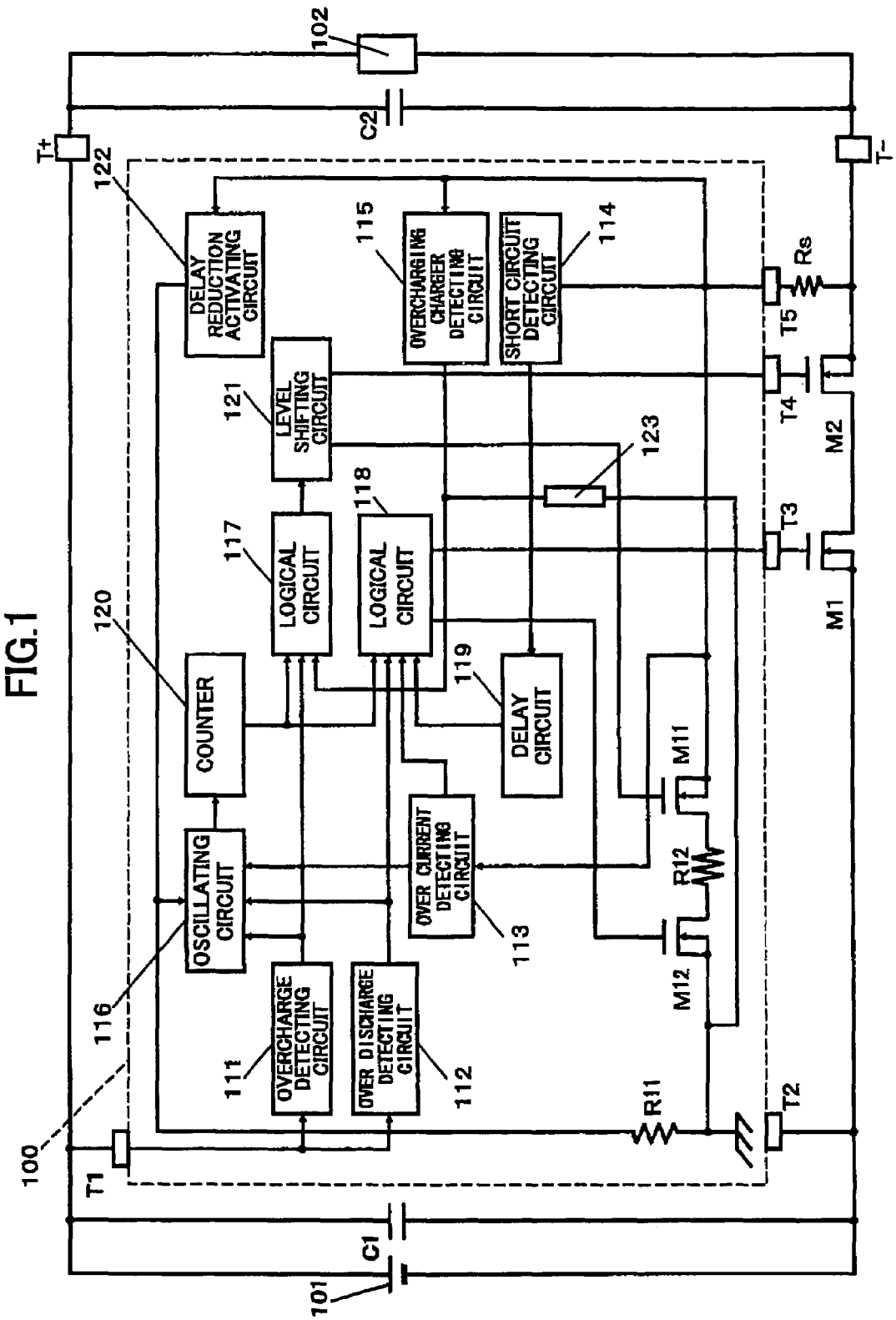
FIG. 1 is a block diagram showing an overall configuration of a battery protecting circuit according to an embodiment of the present invention.

FIG. 1 is a block diagram showing an overall configuration of a battery protecting circuit according to an embodiment of the present invention.

A battery protecting IC 100 according to an embodiment of the present invention detects the voltage and current of a battery 101 and a load 102, and protects the battery 101 from overcharge, over discharge, and over current by switching transistors M1 and M2 that are connected between the battery 101 and the load 102, for example.

The battery 101 may be a rechargeable battery such as a lithium ion battery. The positive electrode of the battery 101 is connected between a positive voltage terminal T+ and a terminal T1 of the battery protecting IC 100. The negative electrode of the battery 101 is connected to a terminal T2 of the battery protecting IC 100 and a negative voltage terminal T− via the drain-source terminals of the transistors M1 and M2. A capacitor C1 is connected in parallel with the battery 101. The capacitor C1 absorbs the fluctuations in the battery voltage of the battery 101.

The load 102 may be an AC adapter for applying a charge voltage to the battery 101, for example. The positive electrode of the load 102 is connected to the terminal T+, and the negative electrode of the load 102 is connected to the terminal T−. A capacitor C2 is connected in parallel with the load 102. The capacitor C2 absorbs the fluctuations in the voltage applied to the load 102.

The transistors M1 and M2 may be n-channel MOS transistors, for example. The drain-source terminals of the transistors M1 and M2 are connected between the negative electrode of the battery 101 and the negative voltage terminal T−. The gate of the transistor M1 is connected to a terminal T3 of the battery protecting IC 100. The gate of the transistor M2 is connected to a terminal T4 of the battery protecting IC 100. A resistor Rs is connected between the negative voltage terminal T− and a terminal T5 of the battery protecting IC 100.

[Battery Protecting IC 100]

The battery protecting IC 100 includes an overcharge detecting circuit 111, an over discharge detecting circuit 112, an over current detecting circuit 113, a short circuit detecting circuit 114, an overcharging charger detecting circuit 115, an oscillating circuit 116, logical circuits 117, 118, a delay circuit 119, a counter 120, a level shifting circuit 121, a delay reduction activating circuit 122, and an output invalidating circuit 123, for example.

The overcharge detecting circuit 111 is connected to the terminal T1, and monitors the voltage of the positive electrode of the battery 110. When the voltage of the positive electrode of the battery 101 increases to a level that is higher than a predetermined overcharge voltage level, the overcharge detecting circuit 111 determines that the battery 101 is overcharged, and outputs a high level output. The output of the overcharge detecting circuit 111 is supplied to the oscillating circuit 116 and the logical circuit 117.

The over discharge detecting circuit 112 is connected to the terminal T1, and monitors the voltage of the positive electrode of the battery 101. When the voltage of the positive electrode of the battery 101 decreases to a level that is lower than a predetermined over discharge voltage level, the over discharge detecting circuit 112 determines that the battery 101 is over discharged, and outputs a high level output. The output of the over discharge detecting circuit 112 is supplied to the oscillating circuit 116 and the logical circuit 118.

The over current detecting circuit 113 is connected to the terminal T5, and monitors the voltage of the terminal T5. When the voltage of the terminal T5 is higher than a predetermined over current voltage level, the over current detecting circuit 113 determines that the battery 101 is in an over current condition, and outputs a high level output. The output of the over current detecting circuit 113 is supplied to the oscillating circuit 116 and the logical circuit 118.

The short circuit detecting circuit 114 is connected to the terminal T5, and monitors the voltage of the terminal T5. When the voltage of the terminal T5 is higher than a predetermined short circuit voltage level, the short circuit detecting circuit 114 determines that a short circuit is generated between the terminals T+ and T−, and outputs a high level output. The output of the short circuit detecting circuit 114 is supplied to the logical circuit 118 via the delay circuit 119. The delay circuit 119 delays the output of the short circuit detecting circuit 114 and supplies the delayed output to the logical circuit 118.

The overcharging charger detecting circuit 115 monitors the voltage of the terminal T5, and when the voltage of the terminal T5 decreases to less than a predetermined over charging charger detection voltage level, the overcharging charger detecting circuit 115 determines that an overcharging charger is connected between the terminals T+ and T− as the load 102, and outputs a high level output. The output of the overcharging charger detecting circuit 115 is supplied to the logical circuit 117.

The oscillating circuit 116 outputs a pulse when the outputs of the overcharge detecting circuit 111, the over discharge detecting circuit 112, and the over current detecting circuit 113 are switched to high level. For example, the oscillating circuit 116 may include a VCO that generates a pulse with a predetermined frequency when the output of the delay reduction activating circuit 122 is at low level, and increases its oscillating frequency when the output of the delay reduction activating circuit 122 is switched to high level. The pulse generated at the oscillating circuit 116 is supplied to the counter 120.

The counter 120 counts the pulses supplied thereto from the oscillating circuit 116, and outputs a high level output when the count value of the pulses reaches a predetermined count value. The output of the counter 120 may be a delayed output of the overcharge detecting circuit 111, the over discharge detecting circuit 112, or the over current discharge circuit 113. It is noted that when the output of the delay reduction activating circuit 122 is at high level, the frequency of the pulse supplied to the counter 120 from the oscillating circuit 116 is higher than the frequency of the pulse supplied thereto when the output of the delay reduction activating circuit 122 is at low level, and thereby, the delay time may be reduced. The output of the counter 120 is supplied to the logical circuits 117 and 118.

The logical circuit 117 outputs a low level output when the output of the overcharge detecting circuit 111 is at high level and the output of the counter 120 is at high level, or when the output of the overcharging charger detecting circuit 115 is at high level. The output of the logical circuit 117 is supplied to the level shifting circuit 121. The level shifting circuit 121 shifts the level of the logical circuit 117 output and supplies the level-shifted output to the gate of a transistor M11 and the gate of the transistor M2 via the terminal T4.

The output of the logical circuit 117 is switched to low level when overcharging of the battery 101 or connection of an overcharging charger is detected. When the output of the logical circuit 117 is switched to low level, the transistors M2 and M11 are turned off and the battery 101 is disconnected from the load 102 so that the battery 101 may be protected.

The logical circuit 118 outputs a low level output when the output of the over discharge detecting circuit 112 or the output of the over current detecting circuit 113 is at high level and the output of the counter 120 is at high level, or when the output of the delay circuit 121 is at high level. The output of the logical circuit 118 is supplied to the gate of a transistor M12 and the gate of the transistor M1 via the terminal T3.

The output of the logical circuit 118 is switched to low level when over discharge, over current, or a short circuit is detected in the battery 101. When the output of the logical circuit 118 is switched to low level, the transistors M1 and M12 are turned off and the battery 101 is disconnected from the load 102 so that the battery 101 may be protected.

The output invalidating circuit 123 may include a fuse that may be easily melted by laser trimming, for example. The output invalidating circuit 123 is connected between ground potential and the connection point connecting the output of the overcharging charger detecting circuit 115 and the logical circuit 117. When the battery 101 is connected, the potential of the connection point connecting the output of the overcharging charger detecting circuit 115 and the logical circuit 117 is maintained at ground level, and when the battery 101 is disconnected, the output of the overcharging charger detecting circuit 115 is supplied to the logical circuit 117.

[Detailed Configuration]

Figure 2:
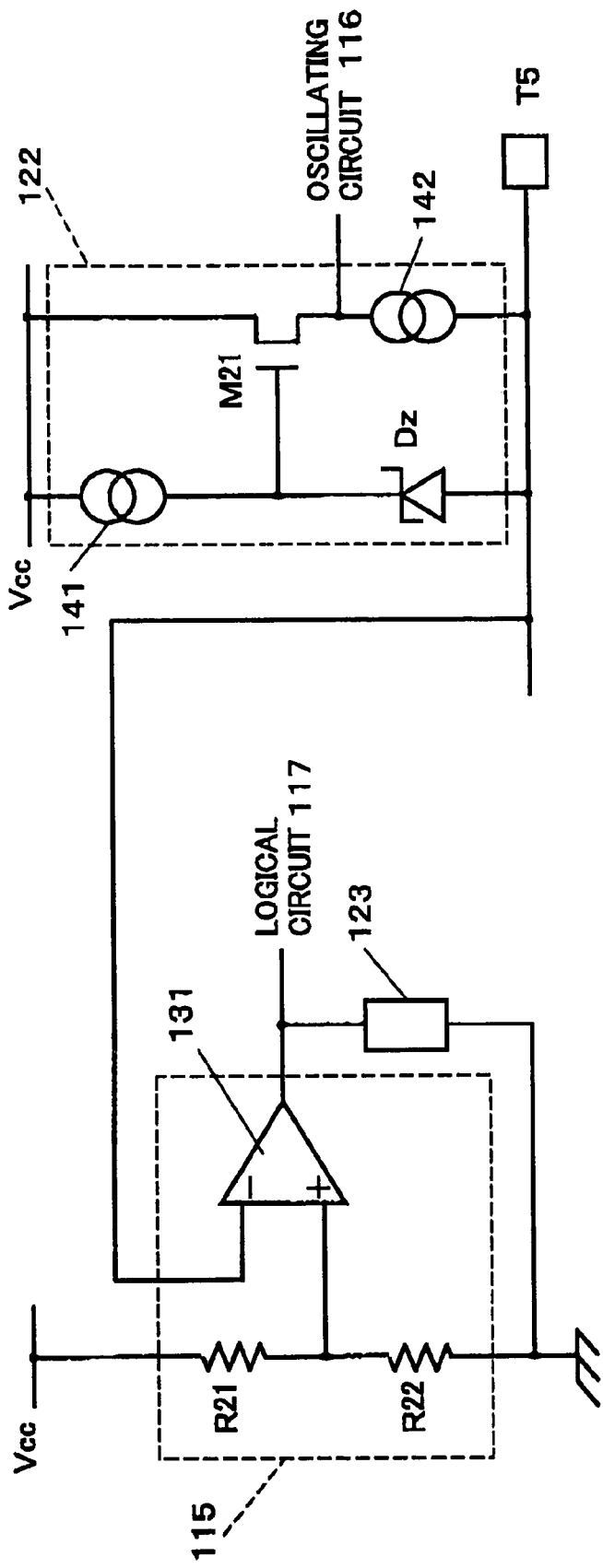
FIG. 2 is a circuit diagram showing a portion of the circuit shown in FIG. 1.

FIG. 2 is a circuit diagram showing a portion of the battery protecting IC 100 according to the present embodiment.

The overcharging charger detecting circuit 115 includes resistors R21, R22, and a comparator 131. The resistors R21 and R22 divide a constant voltage Vcc and generate a reference voltage for detecting connection of an overcharging charger. The reference voltage generated by the resistors R21 and R22 is supplied to a non-inverting input terminal of the comparator 131. An inverting input terminal of the comparator 131 is connected to the terminal T5.

The comparator 131 outputs a low level output when the voltage of the terminal T5 is greater than the reference voltage. When an overcharging charger is connected as the load 102 between the positive voltage terminal T+ and the negative voltage terminal T− so that the voltage of the terminal T5 may be less than the reference voltage, the comparator 131 outputs a high level output. The output of the comparator 131 is supplied to the logical circuit 117.

The output invalidating circuit 123 is connected between ground and the connection point connecting the output of the overcharging charger detecting circuit 115 and the logical circuit 117. The output invalidating circuit 123 may include a fuse that may be easily melted by laser trimming, for example.

The delay reduction activating circuit 122 may be a constant voltage circuit that includes power sources 141, 142, a Zener diode Dz, and a transistor M21, and is connected between the constant voltage Vcc and the terminal T5. The delay reduction activating circuit 122 is activated to output a high level output when the potential of the terminal T5 decreases so that the potential difference between the constant voltage Vcc and the terminal T5 becomes greater than a predetermined voltage. The output of the delay reduction activating circuit 122 is supplied to the oscillating circuit 116.

The terminals T1 through T5 of the battery protecting IC 100 are connected to an examining apparatus at the wafer stage so that its circuits may be inspected.

[Inspecting Apparatus 200]

Figure 3:
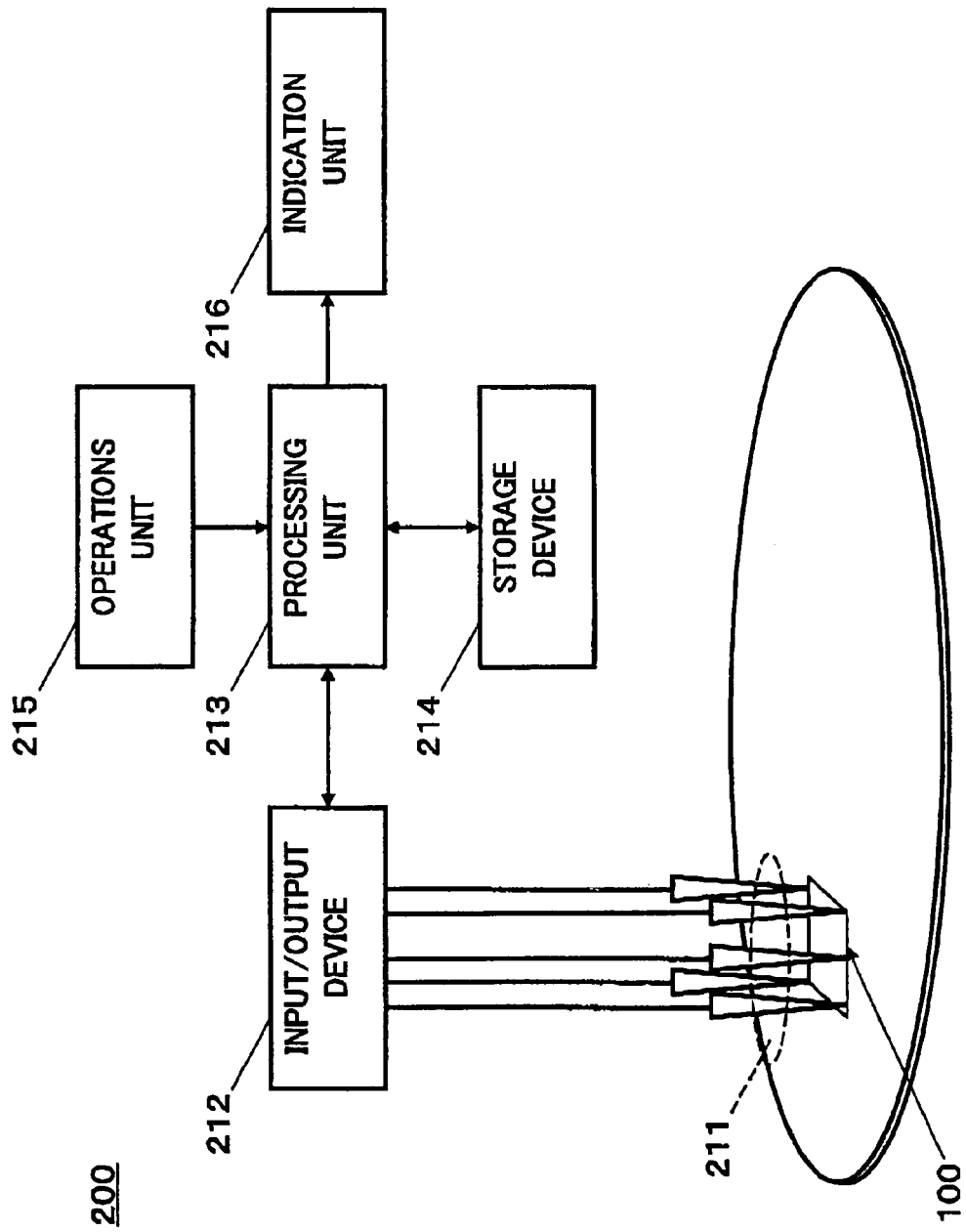
FIG. 3 is a block diagram showing a configuration of an inspecting apparatus.

FIG. 3 is a block diagram showing a configuration of an inspecting apparatus 200.

The inspecting apparatus 200 includes a probe 211, an input/output device 212, a processing unit 213, a storage device 214, an operations unit 215, and an indication unit 216, for example.

The probe 211 comes into contact with the terminals T1-T5 of the battery protecting IC. The probe 211 is connected to the input/output device 212. The input/output device 212 applies a voltage to the probe 211 based on a control signal from the processing unit 213 and detects the voltage of the probe 211. The processing unit 213 is a computer system that executes an inspection process based on a program stored in the storage device 214. The processing unit 213 controls the input/output device 212 based on commands issued from the operations unit 215, sets the terminals T1, T2, and T5 to desired potentials and detects the potential of the terminals T3 and T4 to determine whether the battery protecting IC is operating properly. The determination result obtained by the processing unit 213 is stored in the storage device 214 along with an ID for identifying the battery protecting IC 100. Also, the determination result is indicated at the indication unit 216.

[Inspection Operations]

Figure 4:
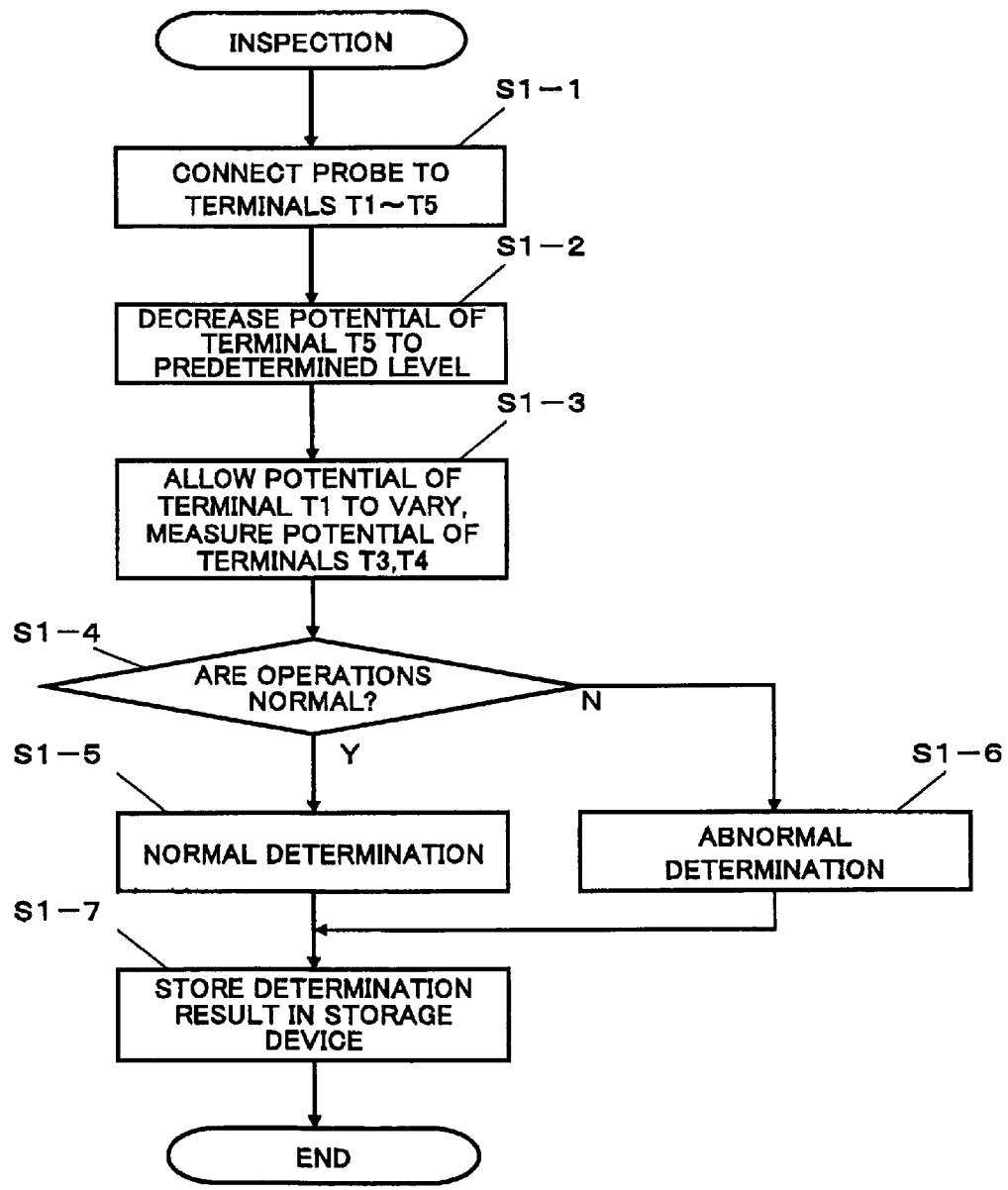
FIG. 4 is a flowchart illustrating inspection operations.

FIG. 4 is a flowchart illustrating the inspection operations.

In step S1-1, the processing unit 213 lowers the probe 211 so that the probe may come into contact with the terminals T1-T5 of the battery protecting IC 100.

Then, in step S1-2, the processing unit 213 decreases the potential of the terminal T5 to a negative potential of a predetermined level. As a result, the delay reduction activating circuit 122 is activated, the frequency of the oscillating pulse of the oscillating circuit 116 is increased, and the delay time in overcharge/over discharge/over current detection is reduced. In this case, the fuse of the output invalidating circuit 123 is connected so that the output of the overcharging charger detecting circuit 115 is fixed to a low level and the output of the overcharging charger detecting circuit 115 is invalidated. Accordingly, even if the potential of the terminal T5 is reduced to a negative potential, the terminal T4 may not be switched to high level by the output of the overcharging charger detecting circuit 115.

Then, in step S1-3, the processing unit 213 allows the potential of the terminal T1 to vary, and measures the potential of the terminals T3 and T4. Then, in step S1-4, the processing unit 213 determines whether the battery protecting IC 100 is operating properly. For example, it may be determined that the battery protecting IC 100 is operating properly (normal determination) if the potential of the terminal T4 switches to high level when the potential of the terminal T1 is increased to be greater than the overcharge voltage level, and if the potential of the terminal T3 is switched to high level when the potential of the terminal T1 is decreased to less than the over discharge voltage level.

In the case where the processing unit 213 determines in step S1-4 that the battery protecting IC 100 is operating properly, it determines that the battery protecting IC 100 is normal in step S1-5, and stores the determination result in the storage device 214 and indicates the determination result at the indication unit 216 in step S1-7.

On the other hand, in the case where the processing unit 213 determines in step S1-4 that the battery protecting IC 100 is not operating properly, it determines that the battery protecting IC 100 is abnormal in step S1-6, and stores the determination result in the storage device 214 and indicates the determination result at the indication unit 216 in step S1-7.

The operations of the battery protecting IC 100 may be examined in the manner described above. In this case, the delay time of overcharge/over discharge/over current detection is reduced so that examination may be speedily conducted.

After inspection, the fuse of the output invalidating circuit 123 may be melted in a laser trimming process. By melting the fuse of the output invalidating circuit 123 in the laser trimming process, the output of the overcharging charger detecting circuit 115 may be disconnected from ground so that when connection of an overcharging charger is detected, a high level output may be supplied to the logical circuit 117 as the output of the overcharging charger detecting circuit 115. In other words, the output of the overcharging charger detecting circuit 115 may be validated. In this way, the overcharging charger detecting function may be implemented.

It is noted that during normal operations, the terminal T5 may not have a negative potential other than when connection of the overcharging charger is detected, and the output of the delay reduction activating circuit 122 may be maintained at low level. Accordingly, overcharge/over discharge/over current detection may be delayed through hysteresis control, for example.

Also, it is noted that the delay reduction activating circuit 122 may be activated when connection of an overcharging charger is detected. In this case, the logical circuit 117 switches the terminal T4 to high level without relying on the output of the counter 120.

According to an aspect of the present invention, a delay time reducing circuit (e.g., delay reduction activating circuit 122) may be activated while the output of a negative voltage terminal voltage detecting circuit (e.g., overcharging charger detecting circuit 115) is invalidated by an output invalidating circuit (e.g., output invalidating circuit 123). In this way, overcharge/over discharge/over current detection operations may be inspected with reduced delay time so that the inspection time may be reduced.

According to another aspect of the present invention, the time period from the time an abnormality (e.g., overcharge, over discharge, over current, or short circuit) is detected by an abnormality detecting circuit (e.g., overcharge detecting circuit 111, over discharge detecting circuit 112, over current detecting circuit 113, or short circuit detecting circuit 114) to the time a switch (e.g., transistors M1, M2, M11, M12) is turned off may be reduced by controlling the voltage of a negative voltage terminal (e.g., terminal T5) so that a terminal for reducing such a time period may not be necessary. In this way, the chip area may be reduced in the case where the battery protecting circuit is an integrated circuit.

According to another aspect of the present invention, by validating the output of a negative voltage terminal voltage detection circuit (e.g., overcharging charger detecting circuit 115) by an output invalidating circuit (e.g., output invalidating circuit 123) after inspecting the abnormality detection circuit(s), a function of turning off a switch in response to generation of an abnormal voltage at the negative voltage terminal may be implemented.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese priority application No. 2005-317146 filed on Oct. 31, 2005, the entire contents of which are hereby incorporated by reference.

What is claimed is:

1. A battery protecting circuit, comprising:
   a negative voltage terminal voltage detecting circuit that detects when a voltage of a negative voltage terminal decreases to less than a predetermined voltage;
   an abnormality detecting circuit that detects an abnormality in charge/discharge conditions of a battery;
   a switch that is connected between the battery and the negative voltage terminal, the switch being turned off when the negative voltage terminal voltage detecting circuit detects that the voltage of the negative voltage terminal has decreased to less than the predetermined voltage and when the abnormality detecting circuit detects the abnormality in the charge/discharge conditions of the battery;
   a delay time reducing circuit that reduces a time period from a time the abnormality in the charge/discharge conditions of the battery is detected to a time the switch is turned off when the voltage of the negative voltage terminal decreases to less than the predetermined voltage; and
   an output invalidating circuit that invalidates an output of the negative voltage terminal voltage detecting circuit during inspection, and that validates the output of the negative voltage terminal detecting circuit after the inspection,
   wherein the negative voltage terminal voltage detecting circuit includes a comparator, and the output invalidating circuit is connected between an output of the comparator and ground without intervention of a switch.

2. The battery protecting circuit as claimed in claim 1, wherein
   the output invalidating circuit is connected between ground and the output of the negative voltage terminal voltage detecting circuit, and includes a fuse; and
   the output of the negative voltage terminal voltage detecting circuit is validated by melting the fuse.

3. The battery protecting circuit as claimed in claim 1, wherein
   the negative voltage terminal voltage detecting circuit, the abnormality detecting circuit, and the output invalidating circuit are integrated in a single-chip.

4. The battery protecting circuit as claimed in claim 1, wherein the output invalidating circuit comprises a fuse.

5. The battery protecting circuit as claimed in claim 1, wherein the inspection is a period in which the operation of the abnormality detecting circuit is tested.

* * * * *